(12) United States Patent
Matsunaga et al.

(10) Patent No.: US 9,885,293 B2
(45) Date of Patent: Feb. 6, 2018

(54) CONTROL APPARATUS OF ENGINE (71) Applicant: MITSUBISHI JIDOSHA KOGYO KABUSHIKI KAISHA, Tokyo (JP)

(72) Inventors: Ayatoshi Matsunaga, Tokyo (JP); Yasuo Yamaguchi, Tokyo (JP); Shinichi Murata, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 14/981,437

(22) Filed: Dec. 28, 2015

(65) Prior Publication Data
US 2016/0131051 A1 May 12, 2016

Related U.S. Application Data (63) Continuation of application No. PCT/JP2014/065708, filed on Jun. 13, 2014.

(30) Foreign Application Priority Data

Jun. 27, 2013 (JP) ................................ 2013-135554

(51) Int. Cl.
*F02D 41/30* (2006.01)
*F02D 23/02* (2006.01)
*F02D 43/00* (2006.01)
*F02B 37/18* (2006.01)
*F02D 41/00* (2006.01)
(Continued)

(52) U.S. Cl.
CPC ............. *F02D 23/02* (2013.01); *F02B 33/40* (2013.01); *F02B 37/18* (2013.01); *F02B 37/183* (2013.01); *F02D 41/0007* (2013.01); *F02D 41/3005* (2013.01); *F02D 41/3094* (2013.01); *F02D 43/00* (2013.01); *F02D 41/34* (2013.01); *F02D 2041/389* (2013.01); *Y02T 10/144* (2013.01)

(58) Field of Classification Search
CPC ...... F02B 37/18; F02B 37/183; F02B 37/186; F02D 41/3094; F02D 2041/389
See application file for complete search history.

(56) References Cited

U.S. PATENT DOCUMENTS 4,452,044 A 6/1984 Iwamoto et al.

FOREIGN PATENT DOCUMENTS

JP 61-265331 A 11/1986
JP 2003-83138 A 3/2003
(Continued)

OTHER PUBLICATIONS

Extended European Search Report dated Mar. 14, 2017 in corresponding European Patent Application No. 14817154.9.

*Primary Examiner* — Jonathan Matthias
(74) *Attorney, Agent, or Firm* — Birch Stewart Kolasch & Birch, LLP (57) ABSTRACT

In a control apparatus of an engine having a first fuel injection valve for injecting fuel into an intake path of the engine, a second fuel injection valve for injecting fuel into a combustion chamber of the engine, a supercharger for supercharging intake air for the engine, and a waste gate valve for opening and closing an exhaust bypass passage for bypassing a turbine of the supercharger, the waste gate valve is controlled to act in an opening direction in accordance with an increase in the injection amount of fuel injected from the second fuel injection valve, in a region where the injection amount of fuel from the second fuel injection valve is larger than the injection amount of fuel from the first fuel injection valve.

12 Claims, 6 Drawing Sheets

(51) Int. Cl.
  *F02B 33/40* (2006.01)
  *F02D 41/34* (2006.01)
  *F02D 41/38* (2006.01)

(56) References Cited

FOREIGN PATENT DOCUMENTS

| JP | 2005-214063 A | 8/2005 |
| JP | 2011-122532 A | 6/2011 |
| JP | 2012-163026 A | 8/2012 |
| JP | 2012-167607 A | 9/2012 |

CONTROL APPARATUS OF ENGINE

CROSS REFERENCE TO RELATED APPLICATIONS

This application is a Continuation of PCT International Application No. PCT/JP2014/065708, filed on Jun. 13, 2014, which claims priority under 35 U.S.C. 119(a) to Patent Application No. 2013-135554, filed in Japan on Jun. 27, 2013, all of which are hereby expressly incorporated by reference into the present application.

TECHNICAL FIELD

This invention relates to a control apparatus of an engine equipped with a waste gate valve for adjusting a boost pressure by a turbocharger.

BACKGROUND ART

An engine equipped with a turbocharger (supercharger) is generally provided with a waste gate valve for adjusting the boost pressure of the turbocharger. Upon opening/closing of the waste gate valve, the following advantages, for example, are obtained: An excessive rise in the boost pressure is suppressed, whereby stability of the boost pressure can be ensured, and damage to the engine or the turbocharger itself can be inhibited. In recent years, it has been common practice to actively control the opening/closing action of the waste gate valve in accordance with the operating state of the engine. There has been, for example, a turbocharger-equipped engine having a first fuel injection valve for injecting fuel to an intake path (intake port) (i.e., port injection valve), and a second fuel injection valve for injecting fuel into a combustion chamber (i.e., cylinder injection valve), wherein in accordance with the operating state of the engine, the cylinder injection valve and the port injection valve are controlled, and a waste gate valve (exhaust bypass valve) is also opened and closed as appropriate (see, for example, Patent Document 1).

This Patent Document 1 discloses a technology which opens the exhaust bypass valve together with an intake bypass valve, for example, when shifting from a homogeneous lean operation concurrently using supercharging to stratified combustion involving no supercharging.

PRIOR DOCUMENTS

Patent Documents

Patent Document 1: JP-A-2005-214063

SUMMARY OF THE INVENTION

Problems to be Solved by the Invention

Assume that in a situation where the operating state of the engine is, for example, in a low load operating range with a small amount of air or a small flow rate of air, fuel is directly injected from the second fuel injection valve into the combustion chamber. In this case, fuel and intake air are mixed insufficiently. Thus, combustion efficiency decreases, with the result that fuel economy may deteriorate or the exhaust gas may be adversely affected. Moreover, fuel deposits on the top surface of the piston and the inner wall of the cylinder, thus potentially posing problems such as dilution of an engine oil (oil dilution) or formation of carbon.

With the above-mentioned turbocharger-equipped engine having the first fuel injection valve (port injection valve) and the second fuel injection valve (cylinder injection valve), therefore, it is attempted to improve combustion stability or the like by changing the injection amounts or the injection ratios of the first and second fuel injection valves in accordance with the operating state of the engine.

The combustion stability or the like of the engine can be improved by changing, as appropriate, the injection amounts or the injection ratios of the first and second fuel injection valves in accordance with the operating state of the engine. However, the improvement is not sufficient, and a further improvement is desired.

The present invention has been accomplished in the light of the above circumstances. It is an object of the invention to provide a control apparatus of an engine which can enhance combustion stability and also improve fuel economy.

Means for Solving the Problems

A first aspect of the present invention, for solving the above problems, is a control apparatus of an engine having a first fuel injection valve for injecting fuel into an intake path of the engine, a second fuel injection valve for injecting fuel into a combustion chamber of the engine, a supercharger for supercharging intake air for the engine, and a waste gate valve for opening and closing an exhaust bypass passage for bypassing a turbine of the supercharger, the control apparatus comprising: fuel injection control device that controls the injection amounts of fuel injected from the first fuel injection valve and the second fuel injection valve in accordance with the operating state of the engine; and valve control device that controls the opening/closing action of the waste gate valve, wherein the valve control device controls the waste gate valve to act in an opening direction in accordance with an increase in the injection amount of fuel from the second fuel injection valve, in a region where the injection amount from the second fuel injection valve is larger than the injection amount from the first fuel injection valve.

A second aspect of the present invention is the control apparatus of an engine according to the first aspect, wherein the valve control device increases an opening of the waste gate valve as the injection amount of fuel injected from the second fuel injection valve increases.

A third aspect of the present invention is the control apparatus of an engine according to the first or second aspect, wherein the valve control device gradually increases an opening of the waste gate valve as the speed of the engine increases.

A fourth aspect of the present invention is the control apparatus of an engine according to any one of the first to third aspects, wherein the valve control device sets an opening of the waste gate valve at a maximum value in the region where the injection amount from the second fuel injection valve is larger than the injection amount from the first fuel injection valve, when the operating state of the engine is in a high rotation, high load region.

A fifth aspect of the present invention is the control apparatus of an engine according to the fourth aspect, wherein the maximum value is smaller than a maximum opening at which the waste gate valve can open based on functions thereof.

Effects of the Invention

In accordance with an output increase or an engine speed increase, the injection amount of fuel injected from the second fuel injection valve increases, and the amount of an exhaust gas increases. In response, the present invention described above properly adjusts the amount of opening of the waste gate valve, thereby enabling the exhaust pressure or the amount of internal EGR to be decreased. By so doing, combustion stabilizes, and an appropriate ignition timing can be provided, with the occurrence of knock being suppressed, so that deterioration in output performance and fuel economy can be inhibited.

MODE FOR CARRYING OUT THE INVENTION

An embodiment of the present invention will now be described in detail by reference to the accompanying drawings.

Figure 1:
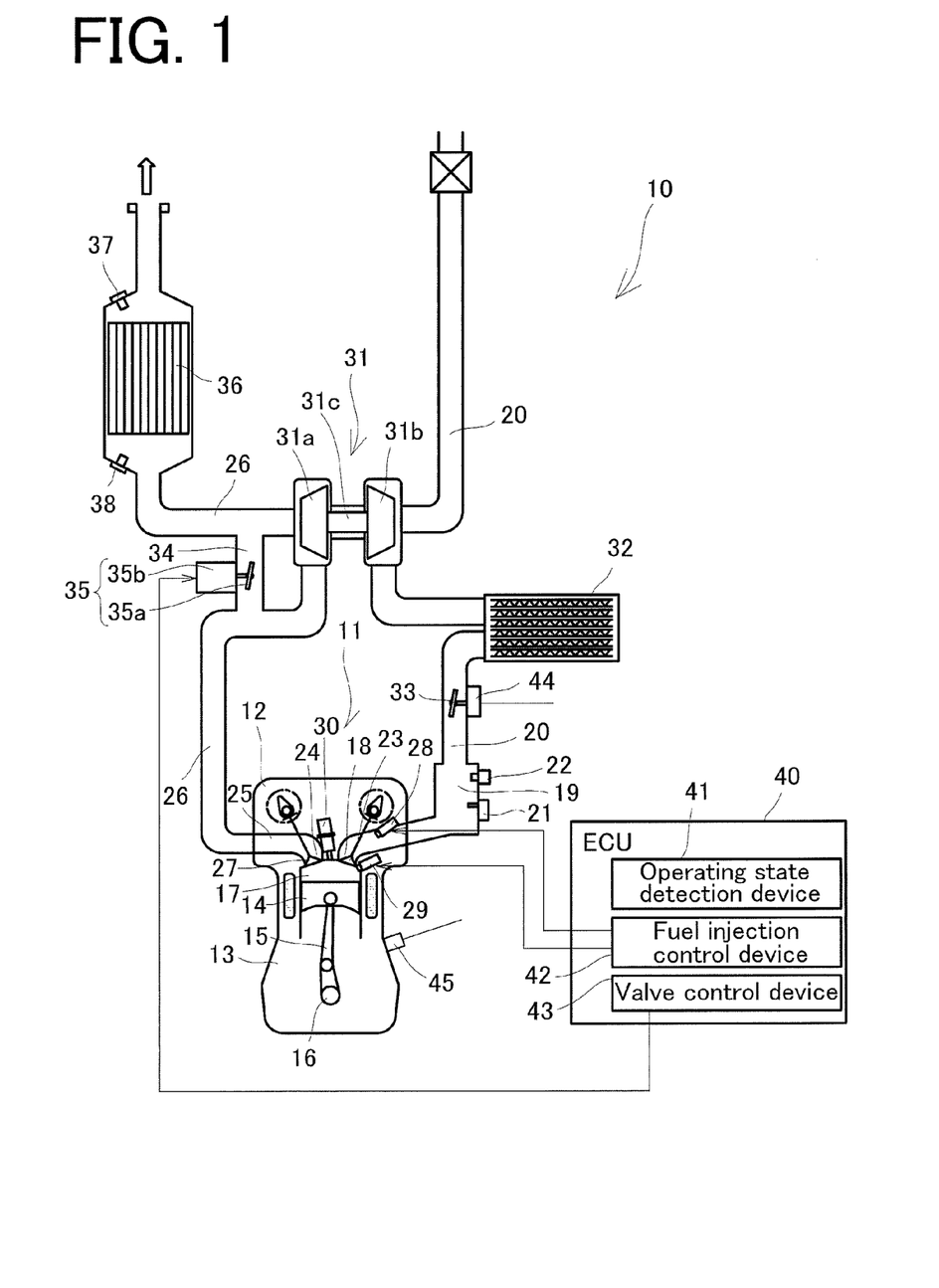
FIG. 1 is a schematic view of an engine equipped with a control apparatus according to an embodiment of the present invention.

First of all, an explanation will be offered for the entire configuration of an engine 10 according to the embodiment of the present invention. As shown in FIG. 1, an engine body 11 constituting the engine 10 has a cylinder head 12 and a cylinder block 13, and a piston 14 is accommodated within the cylinder block 13. The piston 14 is connected to a crankshaft 16 via a connecting rod 15. The piston 14, the cylinder head 12, and the cylinder block 13 form a combustion chamber 17.

An intake port 18 is formed in the cylinder head 12, and an intake pipe (intake path) 20 including an intake manifold 19 is connected to the intake port 18. The intake manifold 19 is provided with an intake pressure sensor (MAP sensor) 21 for detecting an intake pressure, and an intake temperature sensor 22 for detecting the temperature of intake air. An intake valve 23 is also provided inside the intake port 18, and the intake port 18 is opened and closed with the intake valve 23. Further, an exhaust port 24 is formed in the cylinder head 12, and an exhaust pipe (exhaust path) 26 including an exhaust manifold 25 is connected to the interior of the exhaust port 24. An exhaust valve 27 is provided in the exhaust port 24, and the exhaust port 24 is opened and closed with the exhaust valve 27, as is the intake port 18.

Moreover, the engine body 11 is provided with a first fuel injection valve (intake path injection valve) 28 for injecting fuel into the intake pipe (intake path) 20, for example, near the intake port 18, and is also provided with a second fuel injection valve (cylinder injection valve) 29 for directly injecting fuel into the combustion chamber 17 of each cylinder. The first fuel injection valve 28 is supplied with fuel from a low pressure supply pump installed within a fuel tank (not shown) via a low pressure delivery pipe, while the second fuel injection valve 29 is supplied with fuel from a high pressure supply pump, which further pressurizes the fuel supplied from the low pressure supply pump, via a high pressure delivery pipe, although these configurations are not shown. The high pressure delivery pipe is supplied with fuel, which has been supplied from the low pressure supply pump, while being pressurized to a predetermined pressure by the high pressure supply pump. The high pressure delivery pipe is supplied with fuel, which has been supplied from the low pressure supply pump, while being pressurized to a predetermined pressure by the high pressure supply pump. The cylinder head 12 is further mounted with a spark plug 30 for each cylinder.

A turbocharger (supercharger) 31 is provided halfway between the intake pipe 20 and the exhaust pipe 26. The turbocharger 31 has a turbine 31a and a compressor 31b, and the turbine 31a and the compressor 31b are coupled together by a turbine shaft 31c. When an exhaust gas flows into the turbocharger 31, the turbine 31a is rotated by the flow of the exhaust gas and, in accordance with the rotation of the turbine 31a, the compressor 31b is rotated. Air (intake air) pressurized by the rotations of the compressor 31b is sent out into the intake pipe 20, and supplied to each intake port 18.

An intercooler 32 is provided at a portion of the intake pipe 20 downstream of the compressor 31b, and a throttle valve 33 is provided downstream of the intercooler 32. An upstream side and a downstream side of the exhaust pipe 26, with the turbocharger 31 being interposed therebetween, are connected together by an exhaust bypass passage 34. That is, the exhaust bypass passage 34 is a passage for bypassing the turbine 31a of the turbocharger 31. A waste gate valve 35 is provided in the exhaust bypass passage 34. The waste gate valve 35 is equipped with a valve body 35a, and an electrically operated actuator (electric motor) 35b for driving the valve body 35a, and the amount of the exhaust gas flowing through the exhaust bypass passage 34 can be adjusted depending on the opening of the valve body 35a. That is, the waste gate valve 35 is configured to be capable of controlling the boost pressure of the turbocharger 31 by adjustment of its opening.

A three-way catalyst 36, an exhaust gas purification catalyst, is interposed in a portion of the exhaust pipe 26 on the downstream side of the turbocharger 31. An $O_2$ sensor 37 for detecting the $O_2$ concentration of the exhaust gas after passage through the catalyst is provided on the outlet side of the three-way catalyst 36. A linear air-fuel ratio sensor (LAFS) 38 for detecting the air-fuel ratio of the exhaust gas (exhaust air-fuel ratio) before passage through the catalyst is provided on the inlet side of the three-way catalyst 36.

The engine 10 is also equipped with an electronic control unit (ECU) 40, and the ECU 40 is equipped with input/output devices, storage devices for storage of control programs and control maps, a central processing unit, and timers and counters. The ECU 40 exercises the integrated control of the engine 10 based on information from the various sensors. The control apparatus of an engine according to the present embodiment is composed of such an ECU 40, and controls the opening/closing action of the waste gate valve 35 as will be described below.

The following is an explanation for control over the opening/closing action of the waste gate valve by the control apparatus of an engine according to the present embodiment.

The ECU 40 is equipped with an operating state detection device 41, a fuel injection control device 42, and a valve control device 43. The operating state detection device 41 detects the operating state of the engine 10, for example, based on information from the various sensors such as a throttle position sensor 44 and a crank angle sensor 45.

Figure 2:
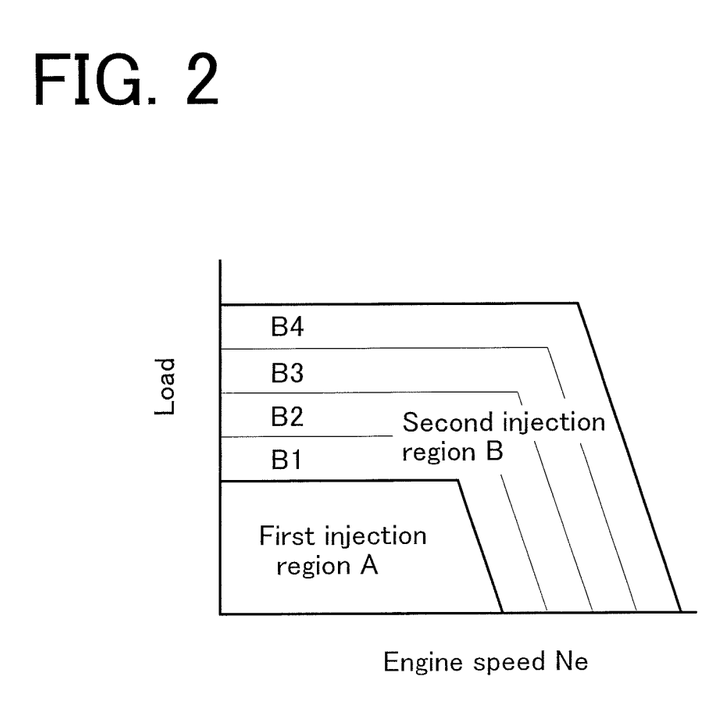
FIG. 2 is an example of a map specifying fuel injection control according to the embodiment of the present invention.

The fuel injection control device 42 controls, as appropriate, the injection amounts of fuel injected from the first fuel injection valve 28 and the second fuel injection valve 29 in accordance with the operating state of the engine 10, namely, in accordance with the detection results of the operating state detection device 41. In the present embodiment, the fuel injection control device 42 controls, as appropriate, the injection amounts of fuel injected from the first fuel injection valve 28 and the second fuel injection valve 29, and also changes, as appropriate, the injection ratios of fuel injected from the first fuel injection valve 28 and the second fuel injection valve 29. Concretely, the fuel injection control device 42 refers to an operating range map as shown in FIG. 2, and determines the relative injection ratio between the first fuel injection valve 28 and the second fuel injection valve 29, and the respective injection amounts of the valves 28 and 29, depending on which of the operating ranges the current operating state of the engine 10 is in.

In the present embodiment, the fuel injection control device 42 exercises control for injecting fuel only from the first fuel injection valve 28 (hereinafter referred to as "MPI injection control"), and control for injecting fuel from each of the first and second fuel injection valves 28 and 29 at a predetermined injection ratio (hereinafter referred to as "MPI+DI injection control"), in accordance with the operating state of the engine 10. As shown in FIG. 2, for example, the operating ranges of the engine 10 are set based on the speed Ne and load of the engine 10. In the present embodiment, two regions are set, a first injection region A which is the operating range on a low rotation, low load side, and a second injection region B which is the operating range on a high rotation, high load side.

If the operating state of the engine 10 is in the first injection region A, the fuel injection control device 42 performs "MPI injection control". That is, the first injection region A is set only for injection from the first fuel injection valve 28. This is because in the low rotation, low load region, the amount of intake air is small and the flow velocity of air is low, so that fuel injected from the second fuel injection valve 29 mixes insufficiently within the combustion chamber 17. Thus, a large amount of half-burned fuel is incorporated in the exhaust gas after combustion, eventually exerting adverse influence on the environment. Moreover, fuel directly injected into the combustion chamber 17 is apt to deposit as fuel droplets on the top surface of the piston 14 or on the wall of the cylinder, causing oil dilution or carbon formation.

If the operating state of the engine 10 is in the second injection region B, on the other hand, the fuel injection control device 42 performs "MPI+DI injection control". That is, the second injection region B is set for injection of fuel from the first fuel injection valve 28 and the second fuel injection valve 29. This is because as the injection amount from the second fuel injection valve 29 increases, the temperature inside the combustion chamber 17 lowers owing to the heat of vaporization of fuel injected from the second fuel injection valve 29, and raises the combustion efficiency. Within the second injection region B, moreover, a plurality of regions (e.g., B1 to B4) are set, starting from the low rotation, low load side. The fuel injection control device 42 appropriately controls the first and second fuel injection valves 28 and 29 in such a manner that the higher rotation, higher load region the operating state of the engine 10 resides in, the higher the injection amount or the injection ratio of the second fuel injection valve 29 becomes. That is, in the example of the map shown in FIG. 2, when the operating state of the engine 10 is in the region B4, the fuel injection control device 42 controls, as appropriate, the first and second fuel injection valves 28 and 29 such that the injection amount or the injection ratio of the second fuel injection valve 29 is the highest. Within each of the regions B1, B2, B3 and B4 of the second injection region B, the injection amounts or the injection ratios of the first and second fuel injection valves 28 and 29 may be constant, or may be such that the injection amount or the injection ratio of the second fuel injection valve 29 is increased more on the higher rotation, higher load side.

Figure 3:
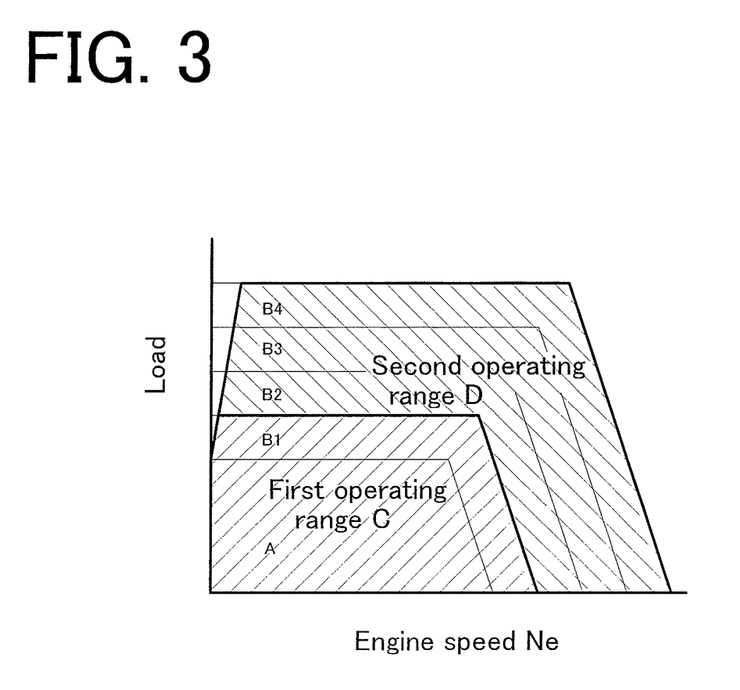
FIG. 3 is a view showing an example of a map specifying opening/closing control over a waste gate valve according to the embodiment of the present invention.

An operating range map for determining the opening/closing action of the waste gate valve 35 is set based on the operating range map for determining the injection amount or injection ratio of fuel (FIG. 2). As FIG. 3 shows an example, for instance, two ranges are set, a first operating range C on a low rotation, low load side, and a second operating range D on a high rotation, high load side. The first operating range C is an operating range in which the injection ratio of the second fuel injection valve 28 is low and, in the present embodiment, includes the above-mentioned first injection region A and a part of the above second injection region B (e.g., region B1). The second operating range D is an operating range in which the injection ratio of the second fuel injection valve 29 is high and, in the present embodiment, corresponds to a part of the second injection region B (regions B2, B3, B4).

The valve control device 43 refers to such an operating range map (FIG. 3) and, when determining based on the detection results of the operating state detection device 41 that the operating state of the engine 10 has moved from the first operating range C to the second operating range D, namely, that the injection amount or injection ratio of the second fuel injection valve 29 has increased, controls the waste gate valve 35 to act in an opening direction. That is, the valve control device 43 controls the opening of the waste gate valve 35 to increase to a predetermined opening.

As noted above, the valve control device 43 controls the waste gate valve 35 to act in the opening direction in response to an increase in the injection amount of fuel injected from the second fuel injection valve 29, in the region where the injection amount of the second fuel injection valve 29 is larger than the injection amount of the first fuel injection valve 28 (in the present embodiment, the second operating range D (regions B2 to B4)). That is, the valve control device 43 adjusts the opening of the waste gate valve 35 (valve body 35a) in accordance with the injection amount or injection ratio of the second fuel injection valve 29, thereby controlling the boost pressure of the turbocharger 31. In other words, when the operating state of the engine 10 is in the region on the high rotation, high load side and the injection amount or injection ratio of the second fuel injection valve 29 increases, the valve control device 43, in accordance with this situation, controls the waste gate valve 35 to act in the opening direction. As mentioned earlier, the injection amounts or injection ratios of the first fuel injection valve 28 and the second fuel injection valve 29 are determined based on the operating range map (see FIG. 2), and the opening of the waste gate valve 35 is also determined similarly based on the predetermined operating range map (see FIG. 3).

On the other hand, when determining that the operating state of the engine 10 has moved from the second operating range D to the first operating range C, for example, the valve control device 43 basically controls the waste gate valve 35 to act in a closing direction. In a low rotation, low load operating range such as at idle, however, the valve control device 43 controls the waste gate valve 35 to an open state, for example, full openness.

Next, an example of control over the opening/closing action of the waste gate valve will be described by reference to a flow chart in FIG. 4.

Figure 4:
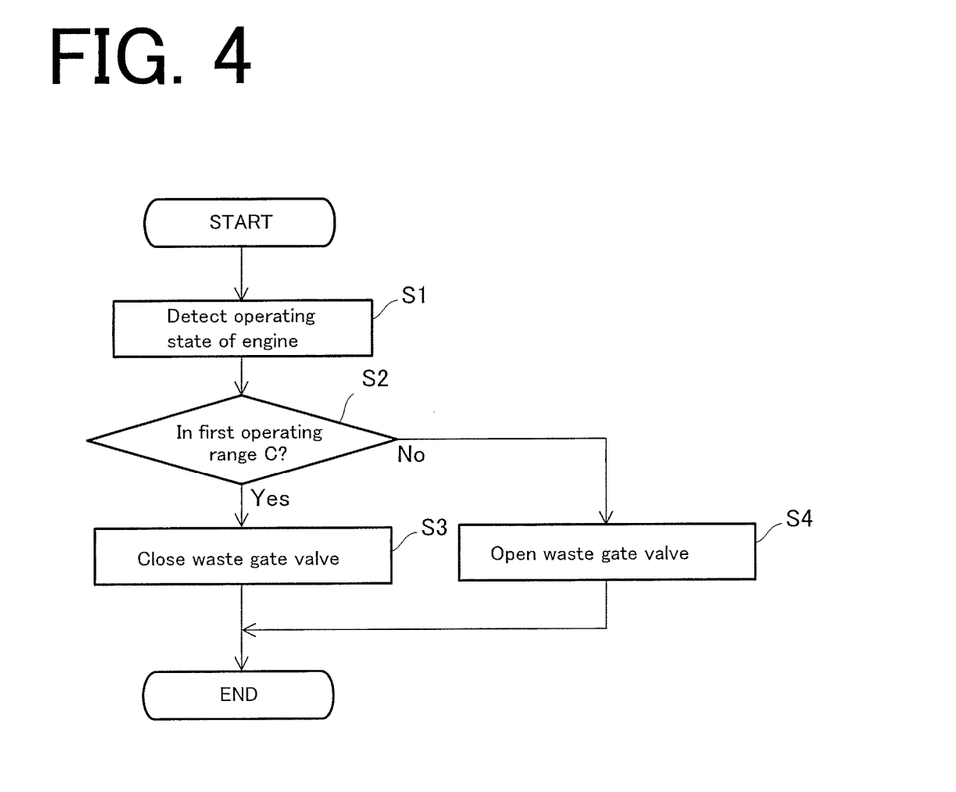
FIG. 4 is a flow chart showing a method of controlling the waste gate valve according to the embodiment of the present invention.

As shown in FIG. 4, the operating state of the engine 10 is detected in Step S1. Concretely, the operating state of the engine 10 is detected, for example, based on information from the various sensors such as the throttle position sensor 44 and the crank angle sensor 45. That is, the speed and load of the engine 10 are acquired. Then, in Step S2, it is determined whether the operating state of the engine 10 is in the first operating range C. If it is determined here that the operating state of the engine 10 is in the first operating range C, the program proceeds to Step S3, in which the waste gate valve 35 is basically controlled to act in a closing direction. If the opening of the waste gate valve 35 has already decreased to a predetermined opening, this opening is retained. If it is determined that the operating state of the engine 10 is not in the first operating range C, that is, it is in the second operating range D, the program proceeds to Step S4, in which the waste gate valve 35 is controlled to act in an opening direction. That is, the waste gate valve 35 is opened to a predetermined opening in accordance with the increase in the injection amount or injection ratio of the second fuel injection valve 29 associated with the movement of the operating state of the engine 10 from the first operating range C to the second operating range D. If the opening of the waste gate valve 35 has already increased to the predetermined opening, this opening is retained.

In the present embodiment, as described above, the valve control device 43 increases the opening of the waste gate valve 35 to the predetermined opening, in the second operating range D, in accordance with the increase in the injection amount or injection ratio of the second fuel injection valve 29. Consequently, the interior of the combustion chamber is cooled by the heat of vaporization of fuel injected from the second fuel injection valve 29 to raise the combustion efficiency, with an excessive rise in the boost pressure by the turbocharger 31 being suppressed. Also, the exhaust resistance is reduced to decrease a pumping loss. Thus, an improvement in fuel economy can be ensured. Moreover, the boost pressure is inhibited from excessively increasing, whereby air flowing into the combustion chamber 17 can be prevented from becoming excessively turbulent. Thus, fuel injected from the second fuel injection valve 29 can be mixed well with intake air within the combustion chamber 17, with the result that combustion stability can be enhanced, and the occurrence of smoke due to combustion residues of fuel can be suppressed.

The above situation is apt to occur conspicuously when the turbocharger 31 equipped with a turbine small in size relative to the piston displacement of the engine 10 is used.

Generally, the size of the turbine of the turbocharger is set in conformity with the piston displacement of the engine. That is, the nozzle diameter and the size of the turbine commensurate with the amount of the exhaust gas passing through the exhaust port are set. In adopting such a turbocharger, therefore, two problems are posed. One of them is a turbo lag which is a response delay until supercharging is started. The other problem is a delay in the warm-up of the catalyst for ameliorating the exhaust gas after cold starting of the engine. That is, after cold starting of the engine, the catalyst needs to be warmed up for early activation. Even if the timing of fuel injection is retarded for catalyst warm-up in order to increase the amount of heat supplied to the catalyst, however, the heat is absorbed by the turbine of the turbocharger to delay warm-up.

In recent years, an engine adopting a turbocharger equipped with a turbine of small size relative to the piston displacement of the engine has been available for solving the above-mentioned problems. With such an engine, even when rotating at a low speed, the turbine rotates efficiently, and rising of supercharging takes place satisfactorily, so that the turbo lag can be decreased. The use of the turbine of small size for the piston displacement, moreover, can make the heat capacity of the turbine low, and decrease the amount of heat lost to the turbine during catalyst warm-up, thus achieving early activation of the catalyst.

With the engine loaded with such a turbocharger, however, the amount of the exhaust gas passing through the turbine is large relative to the turbine size. Thus, work for discharging the exhaust gas increases compared with the engine 10 having the turbine size set in conformity with the piston displacement of the engine. Not only the efficiency deteriorates, but also the exhaust pressure increases to build up the burned gas remaining in subsequent strokes (i.e., internal EGR). In detail, such an engine increases the intake amount with the increase of supercharging. Thus, supercharging rises at an early stage in comparison with conventional turbo engines, and the amount of the exhaust gas also increases early. Furthermore, there are many regions where the amount of the exhaust gas passing through the turbine becomes excessive compared with the turbine size. In such regions, the turbine speed is over-speed, and the efficiency of the turbine lowers. The lowered turbine efficiency converts the exhaust gas, which cannot enter the turbine, into exhaust resistance, thus increasing internal EGR.

When the turbine is at over-speed, the compressor arranged coaxially with the turbine is also apt to surge, making supercharging unstable. That is, regions where supercharging is unstable because of the surge increase in comparison with the conventional turbo engines. Further, with the increase of supercharging, the pressure of intake air supplied into the cylinder rises. After compression by the piston, the temperature inside the cylinder before ignition is elevated greatly, posing a higher possibility for knocking. In an engine adopting a turbocharger equipped with a turbine of small size relative to the piston displacement, in particular, knocking is apt to occur at a lower speed than in conventional turbo engines, because of an improvement in turbo response. As a result, there appear more regions where the appropriate ignition timing cannot be set.

To solve such problems, it is conceivable to utilize the heat of vaporization generated with the increase in the injection amount of fuel injected from the second fuel injection valve, and lower the temperature inside the cylinder using this heat, thereby avoiding knocking. In this case, however, the injection amount is so large that fuel economy deteriorates, and problems arise, such as the occurrence of smoke and increases in the amount of fuel deposited on the inside of the cylinder.

With the present invention, as described above, in accordance with the increase in the injection amount or injection ratio of the second fuel injection valve 29 associated with the increase in the load or engine speed, the amount of opening of the waste gate valve 35 is adjusted. By so doing, the exhaust pressure or the amount of internal EGR can be decreased to avoid a situation where knocking is likely to occur. That is, the injection amount or injection ratio of the second fuel injection valve 29 is not increased more than the increase in the injection amount or injection ratio of the second fuel injection valve 29 associated with the increase in the load or engine speed, and yet the situation where knocking is apt to occur can be avoided. Furthermore, the appropriate ignition timing can be set, so that deterioration in output performance and fuel economy can be inhibited. Such features of the present invention are effective, particularly, in the engine adopting the turbocharger with the small turbine size compared with the piston displacement.

In the present embodiment, the waste gate valve 35 is controlled to act in the opening direction up to the predetermined opening in association with the movement of the operating state of the engine 10 from the first operating range C to the second operating range D (see FIG. 3). Within the second operating range D, however, the opening (opening valve height) of the waste gate valve 35 may be gradually (progressively) changed in accordance with the operating state of the engine 10. That is, when the fuel injection control device 42 increases the injection amount or injection ratio of the second fuel injection valve 29 within the second operating range D, the valve control device 43 may gradually increase the opening of the waste gate valve 35 in accordance with the increase in the injection amount or injection ratio of the second fuel injection valve 29.

Figure 5:
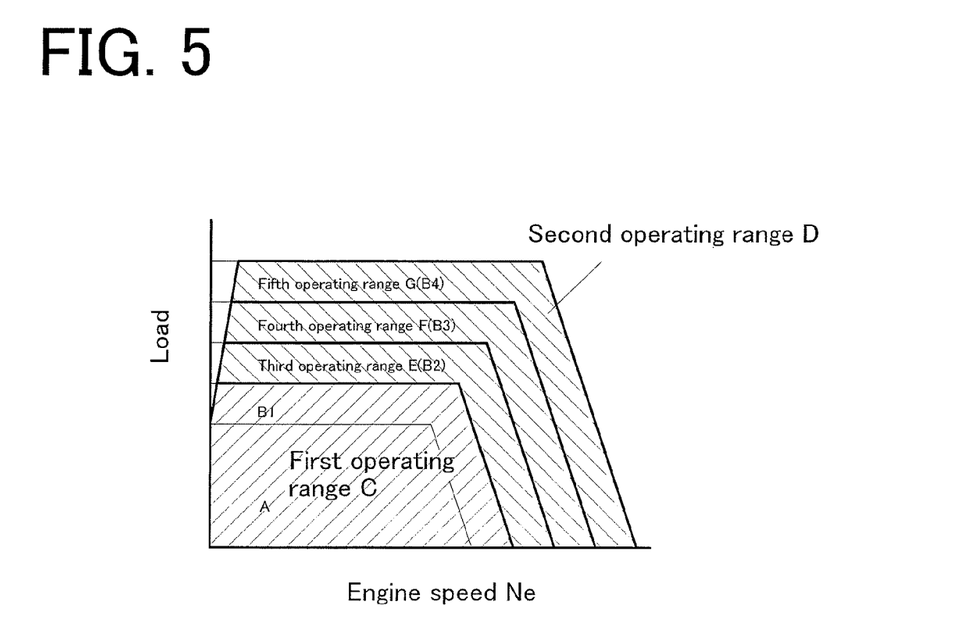
FIG. 5 is a view showing an exemplary map specifying opening/closing control over the waste gate valve according to the embodiment of the present invention.

As shown in FIG. 5, for example, a second operating range D is divided into a third operating range E (region B2), a fourth operating range F (region B3), and a fifth operating range G (region B4) where the injection amounts or injection ratios of fuel injected from the first fuel injection valve 28 and the second fuel injection valve 29 are different. In each of these operating ranges, the opening of the waste gate valve 35 is changed. Concretely, in the third operating range E where the injection amount or injection ratio of fuel injected from the second fuel injection valve 29 is the lowest, the opening of the waste gate valve 35 is rendered the lowest. In the fifth operating range G where the injection amount or injection ratio of fuel injected from the second fuel injection valve 29 is the highest, the opening of the waste gate valve 35 is rendered the highest.

As stated above, the waste gate valve 35 is controlled to act in the opening direction in accordance with the increase in the injection amount or injection ratio of fuel injected from the second fuel injection valve 29, whereby the opening of the waste gate valve 35 can be controlled to a state more suitable for the operating state of the engine 10. Therefore, the combustion stability of the engine 10 can be enhanced further.

The maximum value of the opening of the waste gate valve 35 in the second operating range D, namely, the opening of the waste gate valve 35 in the fifth operating range G, is set to be lower than a maximum value which is used in all operating ranges consisting of the first operating range C and the second operating range D combined. If the valve opening height (opening) of the waste gate valve 35 in the first operating range C, which is the low rotation, low load region, is set at 8 mm (full openness), for example, it is preferred that the maximum valve opening height (opening) in the second operating range D be set at a lower value than 8 mm (full openness), for example, at 6 mm. This is because in a high rotation, high load region, combustion within the combustion chamber 17 is apt to be unstable, and a decline in output is liable to occur owing to the occurrence of knocking. In the event of the decline in output, it is necessary to close the waste gate valve 35 to raise the boost pressure, thereby restoring the output again to a required output. However, the time until rising of the boost pressure is different, for example, between the closing of the valve from the full-open value in the first operating range C (opening valve height: 8 mm) and the closing of the valve from the full-open value in the second operating range D (opening valve height: 6 mm). That is, closing of the valve from the valve opening height of 6 mm can raise the boost pressure more quickly, and proves better in supercharging response. In the low rotation, low load region of the first operating range C, on the other hand, the required amount of air is itself small, and this region needs no supercharging. In this region, therefore, a supercharging response is minimally required and, in such a region, a pumping loss should be decreased, with the full-open value as the valve opening height being set at 8 mm to suppress an increase in exhaust pressure maximally. By so doing, it becomes possible to improve fuel economy while fulfilling the desired engine performance. The full openness represents the maximum value in the set range of the waste gate valve 35. Assume, for example, that the waste gate valve can be used physically at an opening height of 0 to 10 mm. Even in this case, if the opening valve height in actual use is 0 to 8 mm, the full openness represents the position at 8 mm.

It is preferred for the valve control device 43 to increase the opening of the waste gate valve 35 gradually in accordance with an increase in the engine speed, as well as an increase in the injection amount or injection ratio of fuel injected from the second fuel injection valve 29. In the second operating range D in the map shown in FIG. 5, for example, as the engine speed increases, the operating range is switched in the sequence of the third operating range E, the fourth operating range F, and the fifth operating range G, even under the constant load. That is, the valve control device 43 controls the waste gate valve 35 based on this map, whereby the opening gradually increases with the increase in the engine speed.

By so gradually increasing the opening with the increase in the engine speed, namely, by controlling the waste gate valve 35 to act in the opening direction in conformity with the increase in the engine rotations, elevation of the exhaust pressure of the engine 10 can be suppressed to reduce the pumping loss, and the waste gate valve 35 can be controlled to a state more suitable for the operating state of the engine 10.

Figure 6:
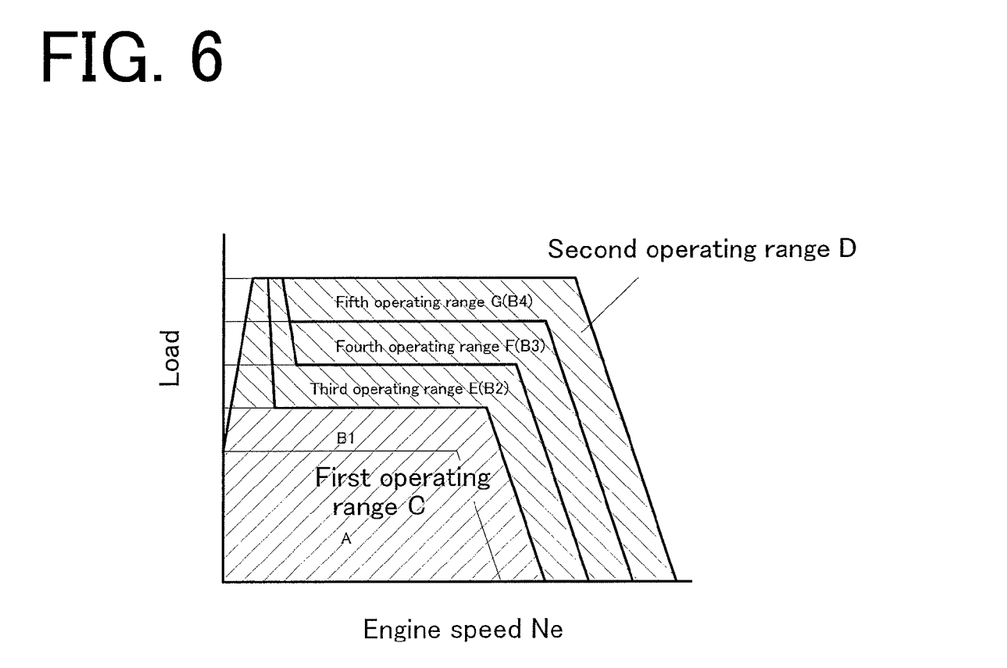
FIG. 6 is a view showing another exemplary map specifying opening/closing control over the waste gate valve according to the embodiment of the present invention.

When the injection ratio is set at a constant value, it is preferred that low rotation, high load regions be included in the first operating range C, as shown, for example, in FIG. 6. Further, it is preferred that a third operating range E be set between a first operating range C and fourth and fifth operating ranges F, G. By these measures, the opening of the waste gate valve 35 can be controlled more appropriately to enhance the combustion stability of the engine 10 further.

The present invention has been described as above with reference to the foregoing embodiment, but it goes without saying that the present invention is in no way limited to this embodiment. For example, only the configuration of the engine has been illustrated in the above embodiment, but needless to say, the present invention can be applied, for example, to an engine of a hybrid vehicle equipped with an electric motor.

EXPLANATIONS OF LETTERS OR NUMERALS

10 Engine
11 Engine body
12 Cylinder head
13 Cylinder block
14 Piston
15 Connecting rod
16 Crankshaft
17 Combustion chamber 18 Intake port
19 Intake manifold
20 Intake pipe
21 Intake pressure sensor
22 Intake temperature sensor
23 Intake valve
24 Exhaust port
25 Exhaust manifold
26 Exhaust pipe
27 Exhaust valve
28 First fuel injection valve
29 Second fuel injection valve
30 Spark plug
31 Turbocharger
32 Intercooler
33 Throttle valve
34 Exhaust bypass passage
35 Waste gate valve
36 Three-way catalyst
37 $O_2$ sensor
38 Linear air-fuel ratio sensor (LAFS)
40 ECU
41 Operating state detection device
42 Fuel injection control device
43 Valve control device
44 Throttle position sensor
45 Crank angle sensor

The invention claimed is:

1. A control apparatus of an engine having
a first fuel injection valve for injecting fuel into an intake path of the engine,
a second fuel injection valve for injecting fuel into a combustion chamber of the engine,
a supercharger for supercharging intake air for the engine, and
a waste gate valve for opening and closing an exhaust bypass passage for bypassing a turbine of the supercharger,
the control apparatus comprising:
fuel injection control device that controls injection amounts of fuel injected from the first fuel injection valve and the second fuel injection valve in accordance with an operating state of the engine; and
valve control device that controls an opening/closing action of the waste gate valve,
wherein the valve control device controls the waste gate valve to act in an opening direction in accordance with an increase in the injection amount of fuel from the second fuel injection valve, in a region where the injection amount from the second fuel injection valve is larger than the injection amount from the first fuel injection valve.

2. The control apparatus of an engine according to claim 1, wherein
the valve control device increases an opening of the waste gate valve as the injection amount of fuel injected from the second fuel injection valve increases.

3. The control apparatus of an engine according to claim 2, wherein
the valve control device gradually increases an opening of the waste gate valve as a speed of the engine increases.

4. The control apparatus of an engine according to claim 3, wherein
the valve control device sets an opening of the waste gate valve at a maximum value in the region where the injection amount from the second fuel injection valve is larger than the injection amount from the first fuel injection valve, when the operating state of the engine is in a high rotation, high load region.

5. The control apparatus of an engine according to claim 4, wherein
the maximum value is smaller than a maximum opening at which the waste gate valve can open based on functions thereof.

6. The control apparatus of an engine according to claim 2, wherein
the valve control device sets an opening of the waste gate valve at a maximum value in the region where the injection amount from the second fuel injection valve is larger than the injection amount from the first fuel injection valve, when the operating state of the engine is in a high rotation, high load region.

7. The control apparatus of an engine according to claim 6, wherein
the maximum value is smaller than a maximum opening at which the waste gate valve can open based on functions thereof.

8. The control apparatus of an engine according to claim 1, wherein
the valve control device gradually increases an opening of the waste gate valve as a speed of the engine increases.

9. The control apparatus of an engine according to claim 8, wherein
the valve control device sets an opening of the waste gate valve at a maximum value in the region where the injection amount from the second fuel injection valve is larger than the injection amount from the first fuel injection valve, when the operating state of the engine is in a high rotation, high load region.

10. The control apparatus of an engine according to claim 9, wherein
the maximum value is smaller than a maximum opening at which the waste gate valve can open based on functions thereof.

11. The control apparatus of an engine according to claim 1, wherein
the valve control device sets an opening of the waste gate valve at a maximum value in the region where the injection amount from the second fuel injection valve is larger than the injection amount from the first fuel injection valve, when the operating state of the engine is in a high rotation, high load region.

12. The control apparatus of an engine according to claim 11, wherein
the maximum value is smaller than a maximum opening at which the waste gate valve can open based on functions thereof.

* * * * *